United States Patent [19]

Murata et al.

[11] Patent Number: 4,990,202

[45] Date of Patent: Feb. 5, 1991

[54] METHOD OF MANUFACTURING AN LC COMPOSITE COMPONENT

[75] Inventors: Michihiro Murata; Harufumi Mandai; Yasuyuki Naito, all of Nagaokakyo, Japan

[73] Assignee: Murata Manufacturing Co., Ltd., Japan

[21] Appl. No.: 296,408

[22] Filed: Jan. 9, 1989

Related U.S. Application Data

[62] Division of Ser. No. 879,908, Jun. 30, 1986, abandoned.

[30] Foreign Application Priority Data

Jul. 4, 1985 [JP] Japan .................. 60-147219

[51] Int. Cl.⁵ .......................................... B32B 31/14
[52] U.S. Cl. ...................... 156/89; 29/25.41; 29/25.42; 29/602.1; 29/608; 361/321
[58] Field of Search .......... 156/89; 29/25.41, 25.42, 29/602.1, 608; 361/321 R, 321 T, 321 P, 321 C, 321 CC, 321 F

[56] References Cited

U.S. PATENT DOCUMENTS

| | | | |
|---|---|---|---|
| 2,521,513 | 9/1950 | Gray | 361/270 |
| 3,065,181 | 11/1962 | Robinson | 252/62.62 |
| 3,333,333 | 8/1967 | Noack | 427/131 |
| 3,660,790 | 5/1972 | Palazzetti | 336/69 |
| 3,704,390 | 11/1972 | Grahame | 336/69 |
| 4,078,938 | 3/1978 | Yonezawa et al. | 156/89 |
| 4,311,957 | 7/1980 | Alley et al. | 361/270 |
| 4,322,698 | 3/1982 | Takahashi et al. | 29/602.1 |
| 4,368,407 | 1/1983 | Wroblewski | 361/270 |
| 4,386,985 | 6/1983 | Dirstine | 156/89 |
| 4,406,722 | 9/1983 | Chow et al. | 156/89 |
| 4,552,800 | 11/1985 | Blasch et al. | 428/701 |
| 4,573,101 | 2/1986 | Takeno | 361/328 |
| 4,608,293 | 8/1986 | Wada et al. | 428/699 |
| 4,654,095 | 3/1987 | Steinberg | 156/89 |
| 4,746,557 | 5/1988 | Sakamoto et al. | 29/602.1 |

FOREIGN PATENT DOCUMENTS 2018740 10/1979 United Kingdom .......... 501/134

OTHER PUBLICATIONS

IBM-TDB, vol. 15, No. 11, "Isotropic Ceramic Green Sheet Fabrication Method", (4/79).

Primary Examiner—Caleb Weston
Attorney, Agent, or Firm—Ostrolenk, Faber, Gerb & Soffen

[57] ABSTRACT

An LC composite component having an integral sintered body formed by cofiring green compacts of an inductor material and a capacitor material in an adhered state.

The inductor material and capacitor are both capable of being sintered at a low temperature, so that they may be cofired with substantially no counterdiffusion taking place between them upon cofiring.

15 Claims, 2 Drawing Sheets

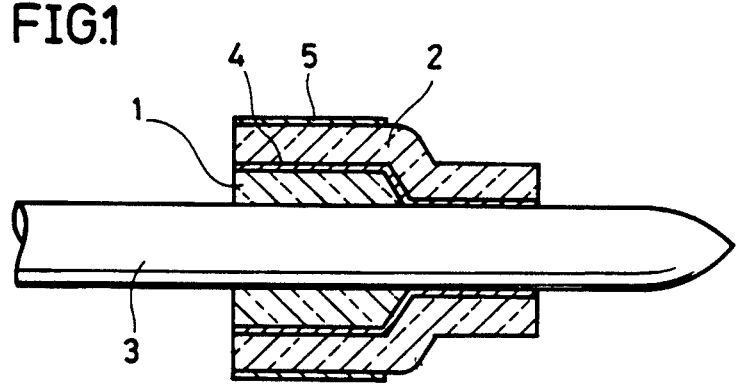
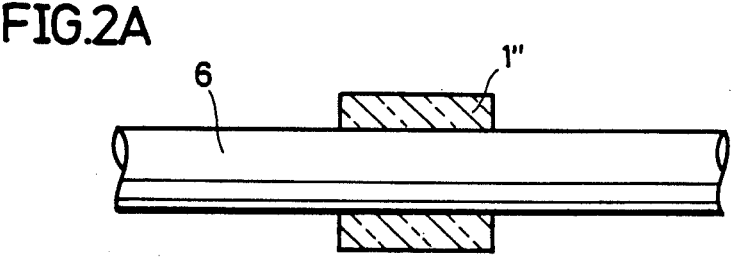
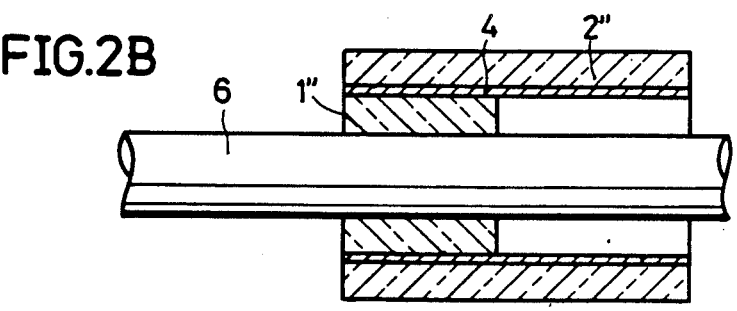
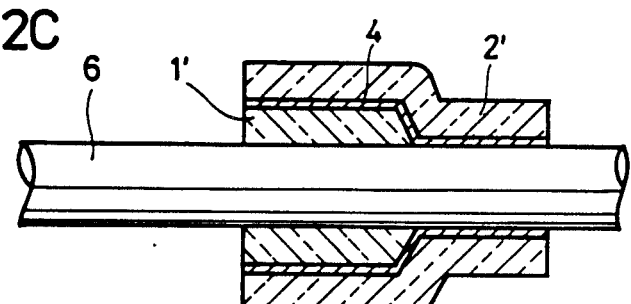
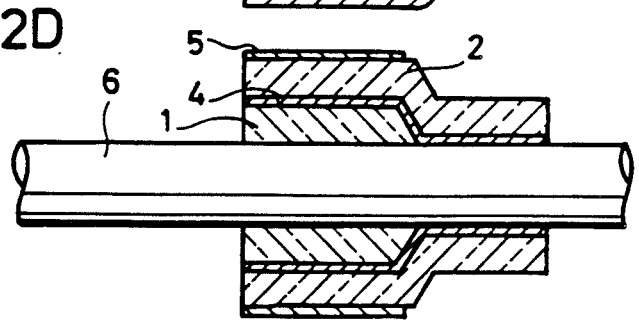

DIELECTRIC MEMBER   INTERFACE   MAGNETIC MEMBER

↑ Pb LINE ANALYSIS

↓ Fe LINE ANALYSIS

METHOD OF MANUFACTURING AN LC COMPOSITE COMPONENT

CROSS-REFERENCE TO RELATED APPLICATION

This is a division of application Ser. No. 06/879,908 filed Jun. 30, 1986, now abandoned.

BACKGROUND OF THE INVENTION

1. Field of the Invention

The present invention relates to a composite component, and more particularly, it relates to an LC composite component comprising an inductor and a capacitor.

2. Description of the Prior Art

In manufacturing an LC composite component, it is preferable to couple an inductor material with a capacitor material to be cofired, thereby to integrally sinter to same and achieve reduction in manufacturing step, cost and size.

In general, however, the inductor material is prepared from ferrite powder etc. and the capacitor material is prepared from barium titanate powder etc. both requiring a high firing temperature of about 1200° to 1400° C., and hence strong reaction is caused between the materials by cofiring, leading to counter diffusion in the interface between the materials. Upon such counter diffusion in the interface, no prescribed Q-value is achieved in the inductor while the capacitor is increased in dielectric dissipation factor tan $\delta$, whereby the entire characteristics are degraded.

In order to solve such problems, a conventional composite component has been manufactured by separately firing an inductor and a capacitor and adhering the same to each other after firing.

However, such a method of separately firing the inductor and the capacitor and adhering the same thereafter requires a number of steps and an increased cost, while the composite component itself cannot be reduced in size.

SUMMARY OF THE INVENTION

It is an object of the present invention to provide an LC composite component effectively manufactured by cofiring an inductor and a capacitor to integrally sinter the same, while preventing counter diffusion in the interface therebetween, integrally sinter the same.

In order to attain the object, green compacts of dielectric and magnetic members which can be sintered at a low temperature are adhered to each other to be integrally sintered.

In such structure, the firing temperature can be greatly lowered in comparison with the conventional case since both the dielectric and magnetic green compacts can be sintered at a temperature much lower than that for the conventional materials. Thus, substantially no counter diffusion is caused in the interface between the materials by cofiring the green compacts in an adhered state at such a low firing temperature, since reaction therebetween is mild.

More specifically, as will be shown in the following detailed description of feature of the invention and an Example, the green compacts in an adhered state can be cofired at a temperature of about 800° to 1100° C. with mild reaction since both the dielectric and magnetic green compacts can be sintered at a temperature much lower than that for the conventional materials. Thus, the number of manufacturing steps can be reduced to improve manufacturing efficiency and reduce the manufacturing cost, while the composite component can be easily reduced in size in comparison with the 0 conventional LC composite component manufactured by separately firing the materials and adhering the same. Further, substantially no counter diffusion takes place in the interface between the dielectric and magnetic green compacts upon cofiring, whereby satisfactory efficiency can be attained similarly to the conventional LC composite component.

These and other objects, features, aspects and advantages of the present invention will become more apparent from the following detailed description of features the present invention when taken in conjunction with the accompanying drawings.

BRIEF DESCRIPTION OF THE DRAWINGS

FIG. 1 is a sectional view showing an embodiment of an LC composite component according to the present invention;

FIGS. 2A to 2D are sectional views illustrating steps of manufacturing the LC composite component as shown in FIG. 1.

DESCRIPTION OF THE PREFERRED EMBODIMENT

Figure 3A:
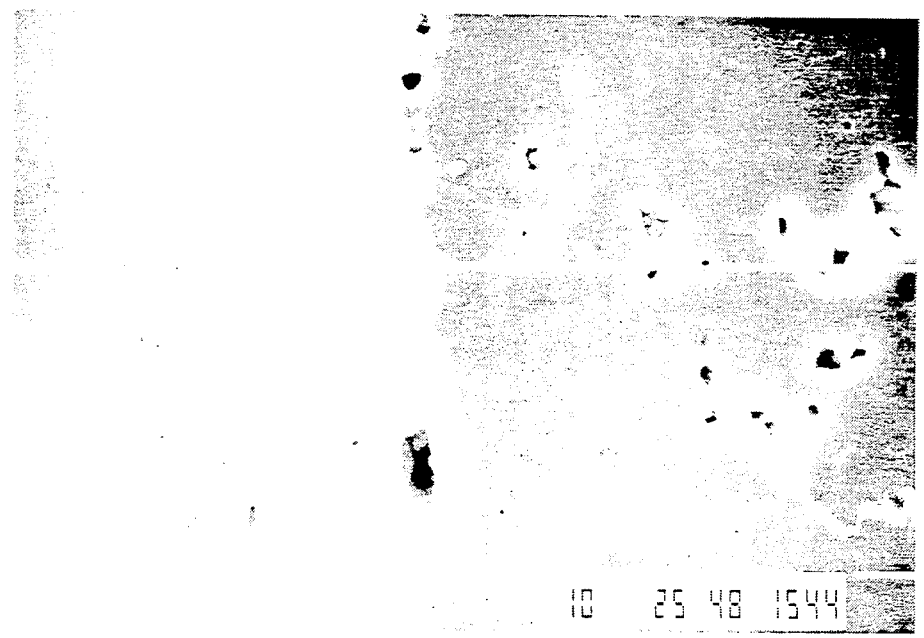
FIGS. 3A and 3B are photomicrographs showing metal organization in the interface between a magnetic member and a dielectric member of the LC composite component according to an embodiment of the present invention.

An embodiment of the present invention is now described with reference to the accompanying drawings.

Referring to FIG. 1, an LC composite component according to the present invention comprises an inner cylindrical magnetic member 1 serving as an inductor, an outer cylindrical dielectric member 2 having different diameters and serving as a capacitor and a conductive stem 3 inserted in the center of the members 1 and 2. The magnetic member 1 and the dielectric member 2 are integrally sintered by adhering green compacts thereof to each other and cofiring the same. An outer electrode layer 5 is provided on the outer surface of a portion of the dielectric member 2 having a larger diameter, and an inner electrode layer 4 is provided in the interface between the magnetic member 1 and the dielectric member 2, while the stem 3 is in contact with the magnetic member 1.

The magnetic member 1 is preferably prepared from a green compact selected from Ni-Zn ferrite materials of various composition ratios as shown in Table 1, which can be sintered at a relatively low temperature lower than about 1150° C. The dielectric member 2 is preferably prepared from a green compact selected from complex perovskite materials containing lead of various composition ratios as shown in Table 2, which can be sintered at a low temperature lower than about 1000° C. The inner and outer electrode layers 4 and 5 are preferably prepared from thin layes of metal such as Pd, Pt or Ag. The inner electrode layer 4 may not necessarily be formed entirely along the interface between the magnetic member 1 and the dielectric member 2, but may be partially formed therein.

TABLE 1

| Composition (Molecular Ratio) | Sintering Temperature (°C.) |
|---|---|
| 0.17NiO-0.3ZnO-0.05CuO-0.48Fe$_2$O$_3$ | 1000-1100 |
| 0.174NiO-0.305ZnO-0.065CuO-0.001 CoO-0.065MgO-0.49Fe$_2$O$_3$ | 1000-1100 |
| 0.12NiO-0.3ZnO-0.08CuO-0.5Fe$_2$O$_3$ | 1000-1100 |
| 0.3NiO-0.1CuO-0.3ZnO-0.3Fe$_2$O$_3$ | 1000-1150 |
| 0.3NiO-0.1CuO-0.3ZnO-0.4Fe$_2$O$_3$ | 1000-1150 |
| 0.4NiO-0.1CuO-0.26ZnO-0.4Fe$_2$O$_3$ | 1000-1150 |
| 0.17NiO-0.08CuO-0.3ZnO-0.45Fe$_2$O$_3$ | 1000-1150 |

TABLE 2

| COMPOSITION (Molecular Ratio) | Sintering Temperature (°C.) | Permittivity | Dielectric Dissipation Factor | Specific Resistance (Ω cm) |
|---|---|---|---|---|
| (1-x)Pb(Fe$_{\frac{1}{2}}$ Nb$_{\frac{1}{2}}$)O$_3$-xA(Cu$_{\frac{1}{4}}$ Nb$_{\frac{3}{4}}$)O$_3$ (where A: at least one of Pb, Ba, Sr and Ca, x = 0.001-0.12) | 900 (where x = 0.08, MnO$_2$: zero) | 16400 (do) | 0.99 (do) | 1.96 × 10$^{11}$ (do) |
| xPb(Fe$_{\frac{1}{2}}$ Nb$_{\frac{1}{2}}$)O$_3$-(1-x)Pb(Fe$_{\frac{1}{2}}$ Ta$_{\frac{1}{2}}$)O$_3$ (where x = 0.3-0.7) | 970 (where x = 0.50, no additive) | 12750 (do) | 0.6 (do) | 6.12 × 10$^{11}$ (do) |
| xPb(Fe$_{\frac{1}{2}}$ Nb$_{\frac{1}{2}}$)O$_3$-yPb(Fe$_{\frac{2}{3}}$ W$_{\frac{1}{3}}$)O$_3$-zPb(Zn$_{\frac{1}{2}}$ W$_{\frac{1}{2}}$)O$_3$ (where x, y, z = values in the following polygons: (0.8, 0.19, 0.01) (0.8, 0.1, 0.1) (0.6, 0.1, 0.3) (0.4, 0.3, 0.3) (0.4, 0.5, 0.1) (0.5, 0.49, 0.01)) | 970 (where x = 0.8, y = 0.1, z = 0.1) | 11000 (do) | 0.98 (do) | 7.2 × 10$^{10}$ (do) |
| (1-x)Pb(Fe$_{\frac{1}{2}}$ Nb$_{\frac{1}{2}}$)O$_3$-xA(Cu$_{\frac{1}{4}}$ Ta$_{\frac{3}{4}}$)O$_3$ (where A: at least one of Ba, Sr and Ca, x = 0.01-0.12) | 900 (where A: Ba, x = 0.05) | 15700 (do) | 1.6 (do) | 2.51 × 10$^{11}$ (do) |
| 0.2Pb(Fe$_{\frac{2}{3}}$ W$_{\frac{1}{3}}$)O$_3$-0.8Pb(Fe$_{\frac{1}{2}}$ Nb$_{\frac{1}{2}}$)-0.5atmic % Bi | 880-980 | 11300 | 1.5 | 2 × 10$^{10}$ |
| xPb(Ni$_{\frac{1}{2}}$ W$_{\frac{1}{2}}$)O$_3$-(1-x)PbTiO$_3$ (where x = 0.3-0.6) | 980 (where x = 0.55) | 6900 (do) | 0.3 (do) | 2 × 10$^{13}$ (do) |
| xPb(Fe$_{\frac{2}{3}}$ W$_{\frac{1}{3}}$)O$_3$(1-x)Pb(Fe$_{\frac{1}{2}}$ Nb$_{\frac{1}{2}}$)O$_3$-A (where x = 0.2-0.5, A: 0.02-2.0 atmic % of at least one of W and Mo) | 900 (where x = 0.5, A: W of 0.2 atmic %) | 9800 (do) | 0.75 (do) | 1.8 × 10$^{10}$ (do) |
| xPb(Mg$_{\frac{1}{4}}$ Fe$_{\frac{1}{4}}$ W$_{\frac{1}{2}}$)O$_3$-(1-x)Pb(Mg$_{\frac{1}{3}}$ Ta$_{\frac{2}{3}}$)O$_3$ (where x = 0.6-0.9) | 940 (where x = 0.8) | 3400 (do) | 1.5 (do) | 1.2 × 10$^{11}$ (do) |
| (1-x)Pb(Fe$_{\frac{2}{3}}$ W$_{\frac{1}{3}}$)O$_3$-xPbTiO$_3$ (where 0 < X ≦ 0.65) | 900 (where x = 0.2) | 11000 (do) | 7.5 (do) | 3.2 × 10$^{11}$ (do) |

Such an LC composite component is manufactured by, e.g., a method as shown in FIGS. 2A to 2D. First, as shown in FIG. 2A, a magnetic green sheet 1" is cylindrically wound around a carbon rod 6. Then, as shown in FIG. 2B, a wider dielectric green sheet 2" having an inner electrode layer 4 of, e.g., conductive metal paste on one surface is cylindrically wound thereon such that the inner electrode layer 4 is inwardly placed, to provide a double-cylindrical structure. Then the double-cylindrical is subjected to pressure formings by means such as a rubber press, so that the outer dielectric green sheet 2" is formed into a cylindrical green compact 2' having sections with different diameters as shown in FIG. 2C. The inner magnetic green sheet 1" is compressed in the diameterical direction to provide a cylindrical green compact 1" (FIG. 2C)

The magnetic and dielectric green compacts 1' and 2' are introduced into a furnace in a state closely adhered to each other and having between them the inner electrode layer 4 and are cofired so as to be integrally sintered. Simultaneously with this, the inner electrode layer 4 is completely baked. In this case, the magnetic green compact 1' is prepared from Ni-Zn ferrite material as shown in Table 1, which can be sintered at a low sintering temperature lower than about 1150° C., and the dielectric green compact 2' is prepared from a complex perovskite material containing lead as shown in Table 2, which can be sintered at a low sintering temperature lower than about 1000° C., whereby both compacts can be fired at a temperature up to 1150° C., generally at about 800° to 1100° C. depending on the materials thereof. Thus, the green compacts 1' and 2' can be integrally sintered substantially with no counter diffusion since reaction upon firing is mild, thereby to form a magnetic member 1 and a dielectric member 2 as shown in FIG. 2D. The carbon rod 6 is dissipated by firing. The firing is sufficiently performed for about one hour. Upon completion of the cofiring, conductive metal paste or the like is coated on the outer peripheral surface of the having the larger the larger diameter portion of the dielectric member 2 and baked to form an outer electrode layer 5 as shown in FIG. 2D. Then a conductive stem 3 is inserted so as to be in contact with the inner electrode layer 4 as shown in FIG. 1, thereby to obtain an LC composite component.

A description will now be presented of an Example of the present invention.

EXAMPLE

A magnetic green sheet of 0.12(NiO)-0.3(ZnO)-0.08(CuO)-0.5(Fe$_2$O$_3$) was wound around a carbon rod of 1.2 mm in outer diameter, and a wider dielectric green sheet (made of Pb(Fel/178 Nb$_{\frac{1}{2}}$)O$_3$) coated on one surface with meal paste, mainly prepared from Pt, was wound thereon to completely cover the magnetic green sheet with the metal paste being inwardly placed. Then the above mentioned layers were formed as shown in FIG. 2C by a rubber press, to obtain a structure in which a portion of the dielcltric green compact having a larger diameter was 2.4 mm in outer diameter.

This structure was introduced into a furnance and fired at 1000° C. for one hour, to obtain a sintered body with a dielectric member of 2 mm in outer diameter and a magnetic member of 1 mm in inner diameter. Then silver paste was coated on the outer peripheral surface of the larger portion of the dielectric member and baked at 800° C. for 20 minutes to form an outer electrode layer. Finally a conductive stem of 1 mm in outer diameter was inserted to complete an LC composite component as shown in FIG. 1.

The outer electrode layer of the dielectric member of the LC composite component thus obtained was gounded and signals of frequency levels as shown in Table 3 were passed through the stem to measure insertion loss, to obtain the results as shown in Table 3.

For the purpose of comparison, a magnetic green compact of 0.12NiO-0.3ZnO-0.08CuO-0.5Fe₂O₃ and a dielectric green compact of Pb(Fe178 Nb178)O₃ were separately sintered at 1000° C. and adhered to each other to form a conventional LC composite component, and the insertion loss thereof was measured as shown in Table 3.

TABLE 3

| Frequency (MHz) | Insertion Loss (dB) | |
| --- | --- | --- |
| | Invention | Prior Art |
| 1 | 0.9 | 0.9 |
| 3 | 3.3 | 3.4 |
| 10 | 11.1 | 11.2 |
| 30 | 26.5 | 26.8 |
| 100 | 49.8 | 50.2 |
| 300 | 81.8 | 82.7 |

It is clearly understood from Table 3 that the composite component according to the present invention has a sufficient filter effect similarly to the prior art.

Figure 3B:
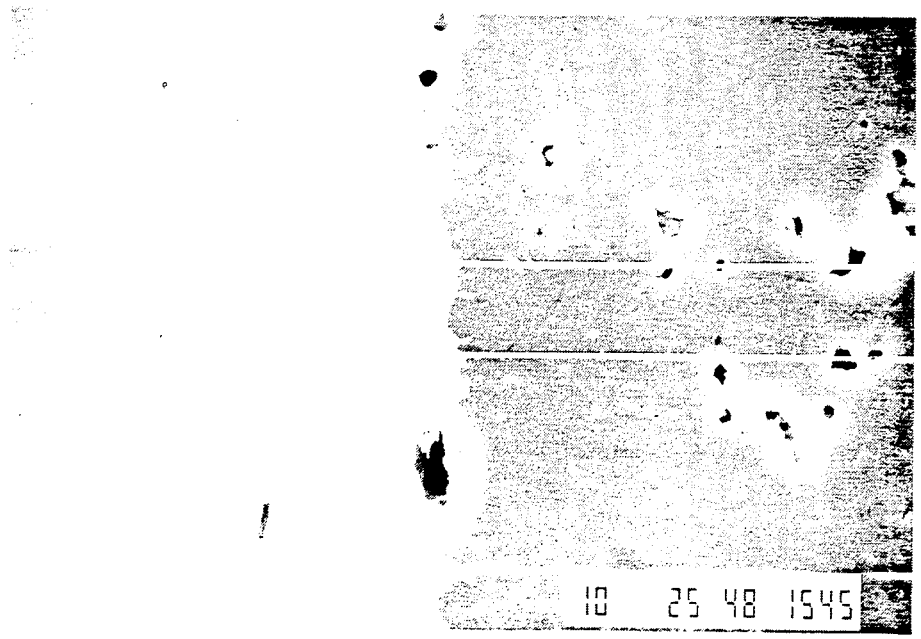

Then the interface between the magnetic and dielectric members of the composite component according to the present invention was photomicrographed to observe the effect of preventing counter diffusion. No electrode layer was formed in the interface. FIGS. 3A and 3B are photomicrographs thereof. As shown in FIGS. 3A and 3B, the interface between the magnetic and dielectric members was clear in the composite component according to the present invention and counter diffusion was satisfactorily prevented.

Although an embodiment the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing an LC composite component, comprising the steps of:
   cofiring green compacts of a dielectric material capable of being sintered at below about 1,000° C. and a magnetic adhered state thereby to integrally sinter the same;
   wherein the compacts are sintered at about 800°–1,100° C. for about one hour such that substantially no counterdiffusion takes place between said compacts upon cofiring;
   at least one inner electrode layer being formed between at least part of said magnetic compact and at least part of said dielectric compact.

2. A method in accordance with claim 1, wherein said dielectric member is prepared from complex perovskite material containing lead and said magnetic member is prepared from Ni-Zn ferrite.

3. A method as in claim 2, wherein said magnetic material includes Ni-Zn-Cu ferrite material.

4. A method in accordance with claim 1, wherein said inner electrode layer is formed surrounding at least part of said magnetic compact; and
   an outer electrode layer is formed surrounding at least part of both said dielectric compact and said magnetic compact.

5. A method in accordance with claim 4, wherein said magnetic compact and at least part of said inner electrode layer are fixed to a conductive stem.

6. A method of manufacturing an LC composite component, comprising the steps of:
   (a) adhering a green compact of a dielectric material which can be sintered at a temperature below about 1,000° C. and a green compact of a magnetic material which can be sintered at a temperature below about 1,150° C; and
   (b) cofiring said compacts so as to integrally sinter the same; wherein the compacts are sintered about 800°–1,100° C. for about one hour such that substantially no counterdiffusion takes place between said compacts upon cofiring;
   (c) at least one inner electrode layer being formed between at least part of said magnetic compact and at least part of said dielectric compact.

7. A method as in claim 6, wherein said dielectric material includes complex perovskite material containing lead, and said magnetic material includes Ni-Zn ferrite material.

8. A method as in claim 7, wherein said magnetic material, includes Ni-Zn-Cu ferrite material.

9. A method as in claim 6, wherein
   said inner electrode layer is formed surrounding at least part of said magnetic compact; and
   an outer electrode layer is formed surrounding at least part of both said dielectric compact and said magnetic compact.

10. A method as in claim 9, wherein said magnetic compact and at least part of said inner electrode layer are fixed to a conductive stem.

11. A method of manufacturing an LC composite component, comprising the steps of:
   (a) forming a substantially cylindrical magnetic green layer;
   (b) forming an inner electrode layer surrounding at least part of said magnetic green layer;
   (c) forming a substantially cylindrical dielectric green layer surrounding at least part of said inner electrode layer and at least part of said magnet green layer, wherein at least part of saaid dielectric green layer defines a substantially cylindrical space within which said dielectric green layer does not surround said magnetic green layer;
   wherein said dielectrical green layer comprises a dielectrical material which can be sintered at a temperature below about 1,000° C. and said magnetic green layer comprises a magnetic material which can be sintered at a temperature below about 1,150° C;
   (d) pressing said above-mentioned green layers and electrode layer so as to form a cylindrical green structure having at least two different diameters corresponding, respectively, to locations where said dielectric green layers surrounds and does not surround said magnetic green layer; and
   (e) cofiring said green structure so as to sinter the green layers at about 800°–1,100° C. for about one hour such that substantially no counterdiffusion takes place between said layers upon cofiring.

12. A method as in claim 14, wherein said dielectric material includes complex perovskite material containing lead, and said magnetic material includes Ni-Zn ferrite material.

13. A method as in claim 12, wherein said magnetic material includes Ni-Zn-Cu ferrite material.

14. A method as in claim 11, wherein said inner electrode layer is formed surrounding at least part of said magnetic compact; and
   an outer electrode layer is formed surrounding at least part of both said dielectric compact and said magnetic compact.

15. A method as in claim 14, wherein said magnetic compact and at least part of said inner electrode layer are fixed to a conductive stem.

* * * * *